(12) United States Patent
Yoneya et al.

(10) Patent No.: US 6,587,640 B1
(45) Date of Patent: Jul. 1, 2003

(54) VIDEO AND AUDIO RECORDING WITH AUDIO BEING RECORDED IN PLURAL CHANNELS INDEPENDENTLY OF VIDEO ON DIFFERENT RECORDING MEDIA

(75) Inventors: Satoshi Yoneya, Kanagawa (JP); Masakazu Yoshimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/180,461

(22) PCT Filed: Mar. 13, 1998

(86) PCT No.: PCT/JP98/01058
§ 371 (c)(1),
(2), (4) Date: Nov. 11, 1998

(87) PCT Pub. No.: WO98/41016
PCT Pub. Date: Sep. 17, 1998

(30) Foreign Application Priority Data

Mar. 13, 1997 (JP) .............................. 9-058672

(51) Int. Cl.$^7$ .......................... H04N 7/04; H04N 7/06; H04N 7/08; H04N 7/52; H04N 5/781; H04N 5/85; H04N 5/90; H04N 5/91
(52) U.S. Cl. ........................................ 386/96; 386/125
(58) Field of Search ............................ 386/39, 45, 96, 386/99, 100, 105–106, 125–126; 369/94, 47.16; 725/92

(56) References Cited

U.S. PATENT DOCUMENTS

| | | | | |
|---|---|---|---|---|
| 3,697,158 A | * | 10/1972 | Mateja | 352/17 |
| 4,584,618 A | * | 4/1986 | Tassery | 360/70 |
| 5,365,045 A | * | 11/1994 | Iijima | 235/380 |
| 5,606,359 A | * | 2/1997 | Youden et al. | 348/7 |
| 5,627,656 A | * | 5/1997 | Sonohara et al. | 386/96 |
| 5,647,047 A | * | 7/1997 | Nagasawa | 386/52 |
| 5,703,997 A | * | 12/1997 | Kitamura et al. | 386/97 |
| 5,991,496 A | * | 11/1999 | Kojima | 386/54 |
| 6,115,536 A | * | 9/2000 | Iwasaki et al. | 386/106 |
| 6,157,771 A | * | 12/2000 | Brewer et al. | 386/111 |
| 6,226,443 B1 | * | 5/2001 | Morioka et al. | 386/82 |
| 6,289,172 B1 | * | 9/2001 | Windrem et al. | 386/105 |

FOREIGN PATENT DOCUMENTS

| | | |
|---|---|---|
| JP | 7-38854 | 2/1995 |
| JP | 7-235151 | 9/1995 |
| JP | 7-322210 | 12/1995 |
| JP | 8-70425 | 3/1996 |
| JP | 9-200673 | 7/1997 |
| JP | 9-320202 | 12/1997 |
| WO | 92/22983 | * 12/1992 |

* cited by examiner

*Primary Examiner*—Andrew Christensen
*Assistant Examiner*—Polin Chieu
(74) *Attorney, Agent, or Firm*—Frommer Lawrence & Haug LLP; William S. Frommer

(57) ABSTRACT

An AV server comprises a processor part (30) for performing various signal processing, such as compression-expansion, of inputted video and audio signals, a video RAID part (21) for storing video signals, and an audio RAID part (10) for storing audio signals. The processor part (30) has a plurality of I/O boards (32n), provided for each channel, for supplying audio signals and video signals to the audio RAID part (10) and the video RAID part (21) respectively, and for receiving audio signals and video signals from the audio RAID part (10) and the video RAID part (21) respectively. The video RAID part (21) is of RAID-3 configuration. The audio RAID part (10) performs writing and reading of audio signals corresponding to each of a plurality of audio signal channels independent of the video RAID part (21).

8 Claims, 9 Drawing Sheets

| M | S | selection | switch |
|---|---|---|---|
| 0 | 0 | M | 0 |
| 0 | 1 | M | 0 |
| 1 | 0 | S | 1 |
| 1 | 1 | andefined | — |

VIDEO AND AUDIO RECORDING WITH AUDIO BEING RECORDED IN PLURAL CHANNELS INDEPENDENTLY OF VIDEO ON DIFFERENT RECORDING MEDIA

BACKGROUND OF THE INVENTION

1. Field of the Invention

The present invention relates to a video and audio recording and reproducing apparatus and method, and more specifically, to a video and audio recording and reproducing apparatus and method in which video data and audio data are stored independent of each other in different recording media.

2. Description of the Related Art

In recent years, with multichannelization of information supply with the spread of CATV (cable television) or the like, there has been an increasing demand for means for simultaneously recording and/or reproducing a plurality of video and audio data using a single video and audio data recording and reproducing apparatus, different from conventional VCR (video cassette recorder). To meet the demand, an apparatus called video server (also referred to as AV (audio and/or video) server) which records and reproduces video and audio using a random accessible (nonlinear accessible) recording medium such as hard disks has been spreading.

Generally, due to requirements for picture and sound of high quality, a video server in a broadcasting station is required to transfer data at high rates and to have large capacity to record long-hour data. Therefore, attempts have been made to increase data transfer rate and to enlarge capacity by using a data recording and reproducing apparatus including a plurality of hard disk (hereinafter referred also to as "HD") units to store video and audio data and to be able to perform parallel processing, or to ensure reliability even if one of the HD units has failed, by recording parity data. Thus, a multichannel video server has become feasible which is capable of coping with a variety of modes of use such as construction of systems including VOD (video on demand) and NVOD (near video on demand), by distributively recording material data composed of a plurality of audio and video data and simultaneously performing multichannel sending or reproducing of the same with staggering reproduction time, even if the number of channels required is different depending on the contents or broadcasting modes of programs to be provided by the broadcasting station.

A data recording and reproducing apparatus used in such a video server employs an RAID (Redundant Arrays of Inexpensive Disks) technique using a plurality of hard disk drives (hereinafter referred to as "HDDs") including a plurality of HDs, as proposed in an article published by Petterson et al. in 1988 ("A Case for Redundant Arrays of Inexpensive Disks (RAID)", ACM SIGMOND Conference, Chicago, Ill., Jun. 13, 1988).

In the above article, RAID is classified into five groups, i.e., RAID-1 to RAID-5. RAID-1 is a format in which the same contents are written into two HDDs. RAID-3 is a format in which input data are divided into portions of a fixed length and recorded in a plurality of HDDs, and parity data which is the exclusive OR of data blocks corresponding to each other for each of the HDDs are written into the other HDD. Furthermore, in RAID-5, unit of division (block) of data is enlarged to record one division unit of the data into one HDD as a data block, and the exclusive OR (parity data) of the data blocks corresponding to each other for each of the HDDs is recorded on the other HDD as a parity block, then the parity block is distributed to all the HDDs. For the other RAIDs, please refer to the above article.

On the other hand, in a conventional video and audio recording and reproducing apparatus to record and reproduce video and audio data, audio data have been considered to be ancillary to video data and the video and audio data have been recorded unitedly.

However, in case of broadcasts relating to news for example, audio data and video data are not always united. There are many occasions in which one and the same video is broadcast in combination with different audio data, e.g., in different languages, of a plurality of audio channels.

Even in the video server using non-linear accessible recording media described above, audio data have been so far processed as part of video data, and therefore it has been impossible to combine one and the same video with a plurality of audio channels or to substitute the audio data for each channel in real time.

SUMMARY OF THE INVENTION

Therefore, an object of the present invention is to provide a video and audio recording apparatus and method in which audio data are recorded in a different recording medium independent of video data.

Another object of the present invention is to provide a video and audio recording apparatus and method in which, for respective audio data of a plurality of audio channels, a plurality of identical data (logical volume) are recorded on different recording media.

More specifically, an object of the present invention is to provide a video and audio recording and reproducing apparatus and method using RAID technique in which a plurality of identical logical volumes are recorded on different recording media, and which enables combination of the same video data with different audio data.

A video and audio recording and reproducing apparatus according to the invention is to record and reproduce video data and audio data by using nonlinear accessible recording media, which comprises a video data recording unit for writing and reading video data by using a nonlinear accessible recording medium in which video data are stored, and an audio data recording unit for writing and reading audio data corresponding to each of a plurality of audio data channels, independent of said video data recording unit, by using a nonlinear accessible recording medium in which audio data are stored and which is different from said recording medium in which video data are stored.

In this video and audio recording and reproducing apparatus, writing and reading of video data are performed by the video data recording unit by using a nonlinear accessible recording medium in which video data are stored, and, writing and reading of audio data corresponding to each of a plurality of audio data channels are performed by the audio data recording unit, independent of said video data recording unit, by using a nonlinear accessible recording medium in which audio data are stored and which is different from said recording medium in which video data are stored.

The video and audio recording and reproducing method according to the invention is a method for recording and reproducing video data and audio data by using nonlinear accessible recording media, by which writing and reading of video data are performed by using a nonlinear accessible recording medium in which video data are stored, and writing and reading of audio data corresponding to each of a plurality of audio data channels are performed, independent of said video data, by using a non-linear accessible recording medium in which audio data are stored and which is different from said recording medium in which video data are stored.

According to the video and audio recording and reproducing apparatus or method of the invention, audio data can be stored in a different recording medium independent of video data, so that it becomes possible to store the video data in redundant structure independent of the audio data, and to combine one and the same video data with different audio data.

Other and further objects, features and advantages of the invention will become fully apparent from the following description.

DETAILED DESCRIPTION OF THE PREFERRED EMBODIMENT

A preferred embodiment of the invention will now be described in detail with reference to the accompanying drawings. In these figures, same or similar components are explained with reference to the same reference numbers or signs.

Here, before description of a preferred embodiment of the invention, for understanding of the invention, the configuration of RAID, especially of RAID-3 will be described with reference to FIG. 10A and FIG. 10B.

Figure 10A:
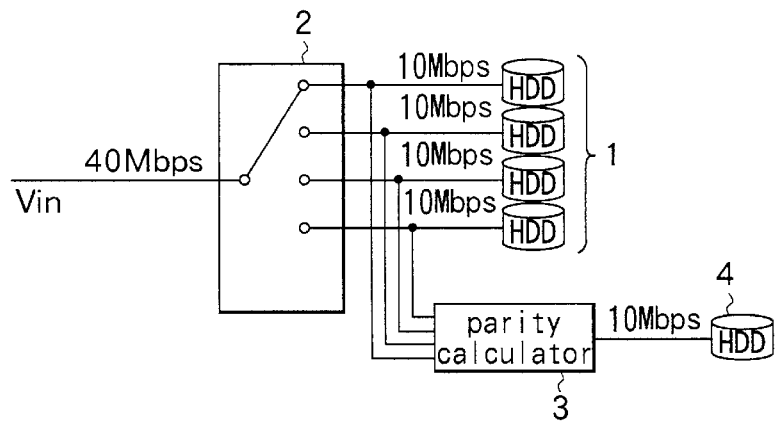
FIG. 10A is a block for explaining configuration of RAID.

FIG. 10A shows the configuration of RAID-3 using four hard disk drives (HDDs) for video data and one HDD for parity data.

In the configuration shown in FIG. 10A, video data ($V_{in}$) transferred at a transfer rate of 40 Mbps (40 Mega bit per second) are inputted to a serial conversion circuit 2. The serial conversion circuit 2 distributes the input data to four HDDs 1 for data in parallel. In FIG. 10A, as the transfer rate of the inputted video data is 40 Mbps, the data are distributed to make a transfer rate of 10 Mbps respectively. The distributed video data are recorded on HDDs 1 respectively. Furthermore, the distributed video data are inputted to a parity calculation circuit 3, and calculation of parity is performed for each of the video data to be recorded in parallel. In this case, the parity calculation circuit 3 calculates and outputs "1" if the number of "1"s of the distributed digital video data is odd, and outputs "0" if the number is even (calculation of odd parity). Then, the result of parity calculation by the parity calculation circuit 3 is outputted to an HDD 4 for parity, and recorded on the HDD 4 as parity data. Transfer rate of the parity data from the parity calculation circuit 3 to the HDD 4 for parity is also 10 Mbps.

Figure 10B:
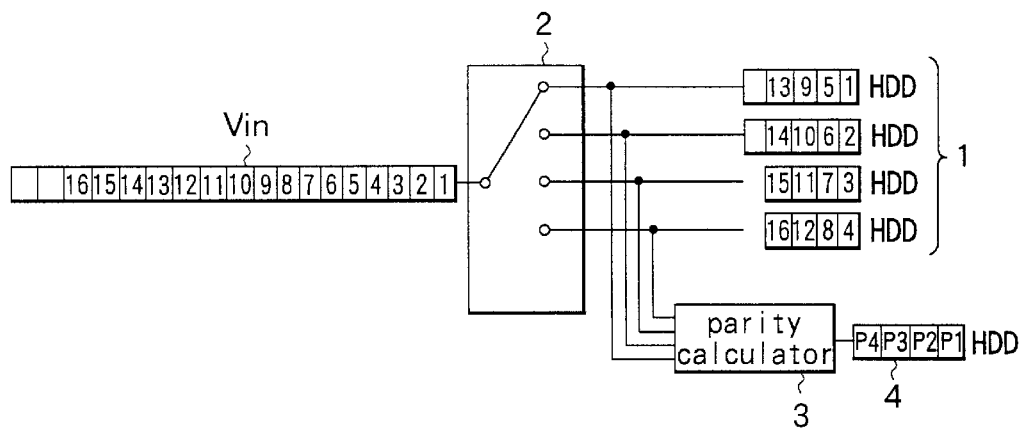
FIG. 10B is a conception view typically showing the flow of data in the configuration of RAID shown in FIG. 10A.

FIG. 10B is a conception view typically showing the flow of data in the configuration of RAID-3 shown in FIG. 10A.

In this figure, video data $V_{in}$ inputted to the serial conversion circuit 2 are distributed to and recorded on the four HDDs 1 for video data in order from the head and respective parity data P1, P2, . . . of the distributed video data are recorded on the HDD 4 for parity data. The parity data P1 (odd parity) of the video data 1, 2, 3 and 4 on HDDs 1 and the parity data P2 (odd parity) of the video data 5, 6, 7 and 8 on HDDs 1 are recorded respectively on the HDD 4 for parity data.

Thus, in the configuration of RAID-3, as shown in prior art, parity data are recorded on an HDD which is different from the HDDs on which other data are recorded, and therefore, when there is an error in the data recorded on the four HDDs 1 or when data cannot be read due to occurrence of failure in the apparatus itself, the parity data are read from the HDD 4 for parity data, and parity calculation is performed by using other readable data, whereby the data with an error or the unreadable data can be restored.

In such RAID configuration, the video data $V_{in}$ to be inputted are composed for example of a signal format called serial digital interface (SDI) format.

SDI is one of standards for communicating audio signals and video signals between video and audio equipments which deal with audio signals and video signals and video cassette recorder (VCR) or the like, and it is standardized with SMPTE-259M of Society of Motion Television Engineering (SMPTE) which publishes standards relating to television and video engineering. This is basically a standard for signals directed to D-1 signal and D-2 signal which are digital signal standards.

Here, SDI signal will be described.

Figures 11A, 11B, 11C:
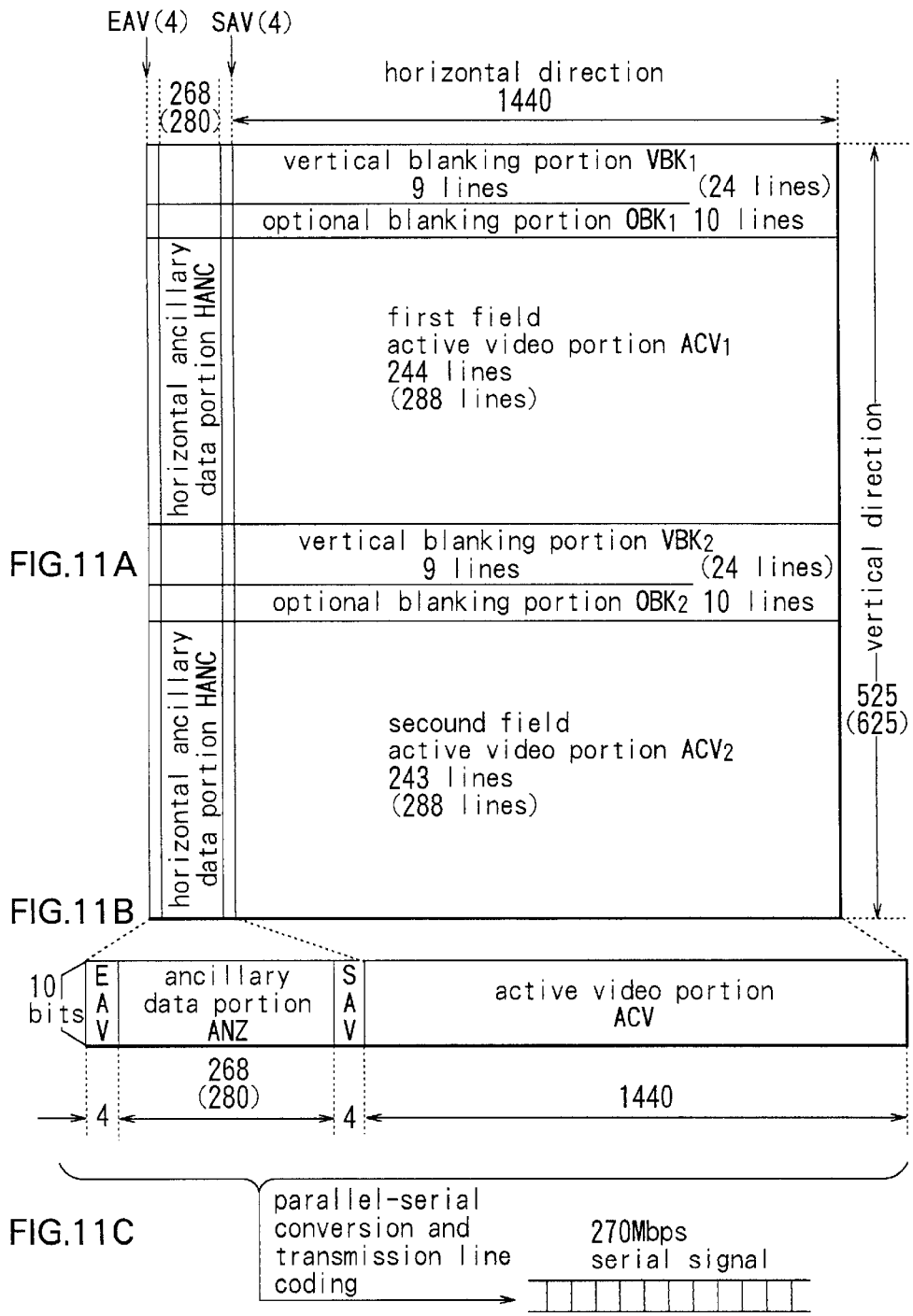
FIGS. 11A, 11B and 11C are explanatory views showing the schematic structure of SDI format by D1 signal.

FIGS. 11A, 11B and 11C show the schematic structure of SDI format by D1 signal.

FIG. 11A shows a frame format (for NTSC system) comprising 1716 pixels in horizontal direction and 525 lines in vertical direction. Digital video signals are placed for example in two areas comprising a first field active video portion $ACV_1$ of 1440 bit in horizontal direction and 244 lines (for NTSC system, corresponding to 288 lines for PAL system) and a second field active video portion $ACV_2$ of 1440 bit in horizontal direction and 243 lines (288 lines for PAL system). Specifically, the first field active video portion $ACV_1$ corresponds to digital video signals of odd field, and the second field active video portion $ACV_2$ corresponds to digital video signals of even field. In front of each of these first and second field active video portions $ACV_1$ and $ACV_2$, vertical blanking portions $VBK_1$ and $VBK_2$ for 9 lines respectively and optional blanking portions $OBK_1$ and $OBK_2$ for 10 lines respectively (in case of PAL system, the sum of VBK$_1$ and OBK$_1$ is 24 lines, and the sum of VBK$_2$ and OBK$_2$ is 25 lines) are inserted respectively.

FIG. 11B shows data structure for 1 line corresponding to the frame format of FIG. 11A.

As shown in FIGS. 11A and 11B, in front and back of the active video portion ACV, 4-bit start synchronization code SAV representing the start of the active video line and 4-bit end synchronization code EAV representing the end of the active video line are inserted. Between the start synchronization code SAV and the end synchronization code EAV, ancillary data portion ANC (in the frame format of FIG. 11A, horizontal ancillary data portion HANC) of 268 bits (280 bits for PAL system) is inserted. In SDI format, audio signals are inserted in a predetermined area of this ancillary data portion ANC. The line format shown in FIG. 11B is of 10-bit width.

When transmitting signals of SDI format, as shown in FIG. 11C, parallel-serial conversion and transmission line coding are performed and the signals are transmitted at a predetermined transfer rate such as 270 Mbps or 360 Mbps.

Video signals and audio signals transmitted in SDI format described above are, when inputted in a recording and reproducing apparatus having RAID-3 configuration as shown in FIG. 10, linked one to one and sequentially written into each HDD 1 byte by byte.

Thus, when the video signal and audio signal are linked one to one, it is difficult to broadcast the audio signals in different languages for each channel independent of the video signals or to perform editing such as substitution of BGM.

Figure 1:
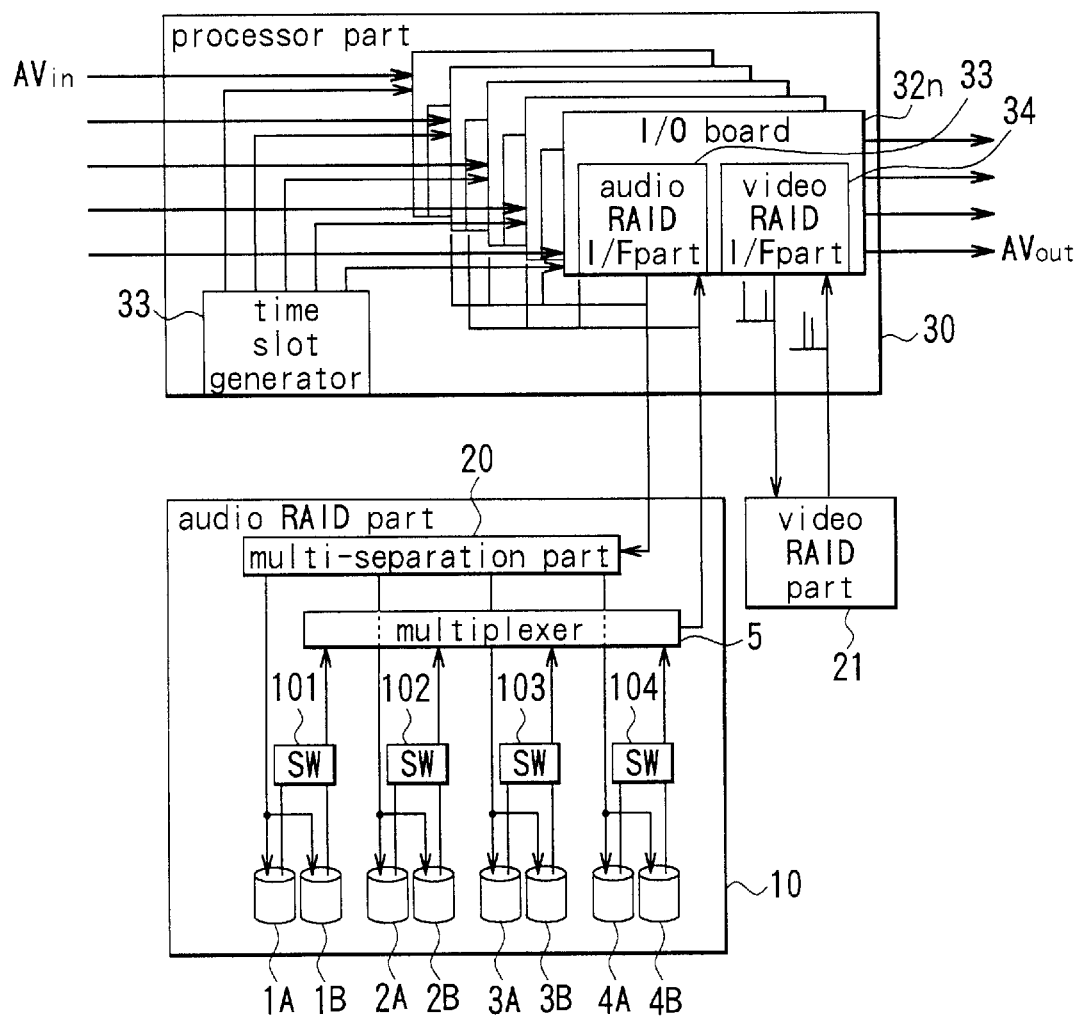
FIG. 1 is a block diagram showing an embodiment according to the invention.

The present invention solves the problem described above. FIG. 1 shows the structure of a video and audio recording and reproducing apparatus called AV server (audio and/or video server) according to the present invention.

The AV server shown in FIG. 1 comprises, as a whole, a processor part 30 for performing various signal processing such as compression-expansion of the inputted video and audio signals, a video RAID part 21 for storing video signals as video data, and an audio RAID part 10 for storing audio signals as audio data. Here, this embodiment assumes use of hard disks as the recording medium; however, nonlinear accessible DVDs (digital video disk or digital versatile disks) or MO (magnetic-optical) disks may also be used.

The video processor part 30 for processing the video and audio signals will now be described briefly.

The video processor part 30 comprises a plurality of I/O (input and/or output) boards 32n (n=1,2, . . .). Signals AV$_{in}$ including video and audio signals inputted in the SDI format described above are inputted to each of the I/O boards 32n, and, signals AV$_{out}$ including the video and audio signals of SDI format are outputted from each of the I/O boards 32n. Here, there are the same number of lines as the number of I/O boards 32 for inputting the SDI signals. Assuming that one I/O board 32 processes SDI signals for one channel, the processor part 30 can process as many channels as the number of I/O boards 32. As shown in FIG. 1, as there are five I/O boards, the processor part 30 can process SDI signals for 5 channels.

The processor part 30 further comprises a time slot generator 33 for generating a time slot signal which represents time slots obtained by time-division of a predetermined period of time. The time slot signal from the time slot generator 33 is supplied to each of the I/O boards 32n of the processor part 30, and each of the I/O boards 32n performs various signal processing within the time slot corresponding to the supplied time slot signal. Accordingly, although each of the I/O boards 32n performs various signal processing with time-division per time slot, it seems as if a plurality of input SDI signals were simultaneously processed, as observed for a certain long period of time.

Each of the I/O boards 32n has an audio RAID interface part (referred to as "audio RAID I/F part" in FIG. 1) 33 and a video RAID interface part (referred to as "video RAID I/F part" in FIG. 1) 34 for supplying audio signals and video signals to the audio RAID part 10 and video RAID part 21 respectively and for receiving audio signals and video signals from the audio RAID part 10 and video RAID part 21 respectively. These interfaces are for adapting the audio signals and video signals to the transfer format of a bus which connects the processor part 30 with the two RAID parts 10 and 21.

Detailed description of the processor part 30 will be given later.

Now, brief description is made as to the RAID parts 10 and 21.

The video RAID part 21 to receive supply of video signals and to store those signals performs writing (recording) and reading (reproduction) of video signals using hard disks which are a nonlinear accessible recording medium, and it corresponds to the video data recording unit in the present invention. As the configuration of the video RAID part 21 corresponds to that of RAID-3 explained with reference to FIGS. 10A and 10B, explanation thereof will not be repeated here.

The audio RAID part 10 to receive supply of audio signals and to store those signals performs writing (recording) and reading (reproduction) of audio signals corresponding to each of a plurality of audio channels, independent of the video RAID part 21, using hard disks which are a nonlinear accessible recording medium and which are different from the hard disks in which video signals are stored. It corresponds to the audio data recording unit in the present invention. The audio RAID part 10 has a multi-separation part 20 for separating, for each channel, audio signals for writing which are multiplexed and inputted, a plurality of HDDs 1A, 1B, . . . in which audio signals separated by the multi-separation part 20 are recorded and stored, a plurality of selection switch parts (referred to as "SW" in FIG. 1) 101, 102, . . . for selecting audio signals reproduced from the plurality of HDDs 1A, 1B, . . . , and a multiplexer part 5 for multiplexing audio signals selectively outputted from the plurality of selection switch parts 101, 102, . . . .

The multi-separation part 20 separates and outputs the inputted audio signals for each channel. In other words, the multi-separation part 20 separates the audio signals from the processor part 30 for each of the HDDs 1A, 1B, . . . to supply the signals to each of the HDDs 1A, 1B, . . . .

The configuration of the HDDs 1A, 1B, . . . to store the audio signals corresponds to that of RAID-1 among the levels of RAID described above, and the video signals supplied by the multi-separation part 20 are written into two HDDs 1A and 1B. In other words, the same audio signals for one channel are written into the HDDs 1A and 1B. Similarly, also on the HDDs 2A and 2B, the same audio signals separated in the multi-separation part 20 are written. The audio RAID part 10 shown in FIG. 1 is composed of four sets of HDDs wherein one set consists of two HDDs on which the same audio signals are recorded. Therefore, if audio signals for one channel is recorded on one set of the HDDs, the audio RAID part 10 can store audio signals for four channels.

Audio signals reproduced from each of the HDDs 1A, 1B, ... are inputted to the switch parts 101, 102, .... To the switch parts 101, 102, ..., audio signals reproduced from two HDDs constituting one set are inputted. In other words, audio signals of the same content are supplied to the switch parts 101, 102, .... To these switch parts 101, 102, ..., the same audio signals are supplied from both HDDs. When audio signals from one HDD, for example HDD 1A, cannot be read at the switch part 101 due to occurrence of some error, audio signals supplied from the other HDD, namely HDD 1B, are selected and outputted.

Details of the switch part 101 will be described later.

Audio signals for each channel outputted from the switch parts 101, 102, ... are inputted to the multiplexer part 5 and multiplexed. The multiplexed audio signals are inputted to each of the I/O boards 32n of the processor part 30 via a bus.

Then, with reference to FIG. 2, each of the I/O boards 32n of the processor part 30 will now be described.

All the I/O boards 32n are of the same structure. In FIG. 2, I/O board $32_1$ is described.

The I/O board $32_1$ comprises an SDI interface part 320 for decoding the inputted SDI signal $AV_{in}$ and for encoding and outputting video and audio signals to SDI output $AV_{out}$, a signal processing part 321 for performing various signal processing, and a CPU (central processing unit) 322 for controlling the signal processing part 321.

The signal processing part 321 comprises an SDI decoder 312A for decoding SDI signal $AV_{in}$ inputted from outside in SDI format described above so as to separate video signals and audio signals, and an SDI encoder 312B for converting video signals and audio signals processed in the apparatus into the format of SDI signal so as to output as signal $AV_{out}$.

Figure 3:
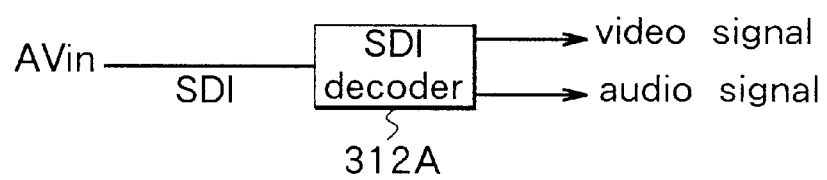
FIG. 3 is an explanatory view for explaining an SDI decoder in FIG. 2.

Here, with reference to FIG. 3, explanation is given as to the SDI decoder 312A.

The SDI signal $AV_{in}$ inputted to the decoder 312A is a serial signal as shown in FIG. 11C. First, the decoder 312A converts the SDI signals inputted in serial format into parallel format by a serial-parallel converter not shown in the figure, and converts the signals for one line of the video into the signals of the format shown in FIG. 11B.

Then, the decoder 312A extracts audio signals inserted in the ancillary portion ANC and video signals inserted in the active video portion ACV, and outputs the extracted audio signals and video signals as outputs of the decoder 312A.

Among the outputs of the SDI decoder 312A, video signals are sent to a video block which is not shown in the figure, and recorded in the video RAID part 21. Audio outputs are sent to the signal processing part 321.

The SDI encoder 312B inputs the video signals from the video block and audio signals from the signal processing part 321, that is, it performs processing reverse to that of the decoder 312A.

Figure 2:
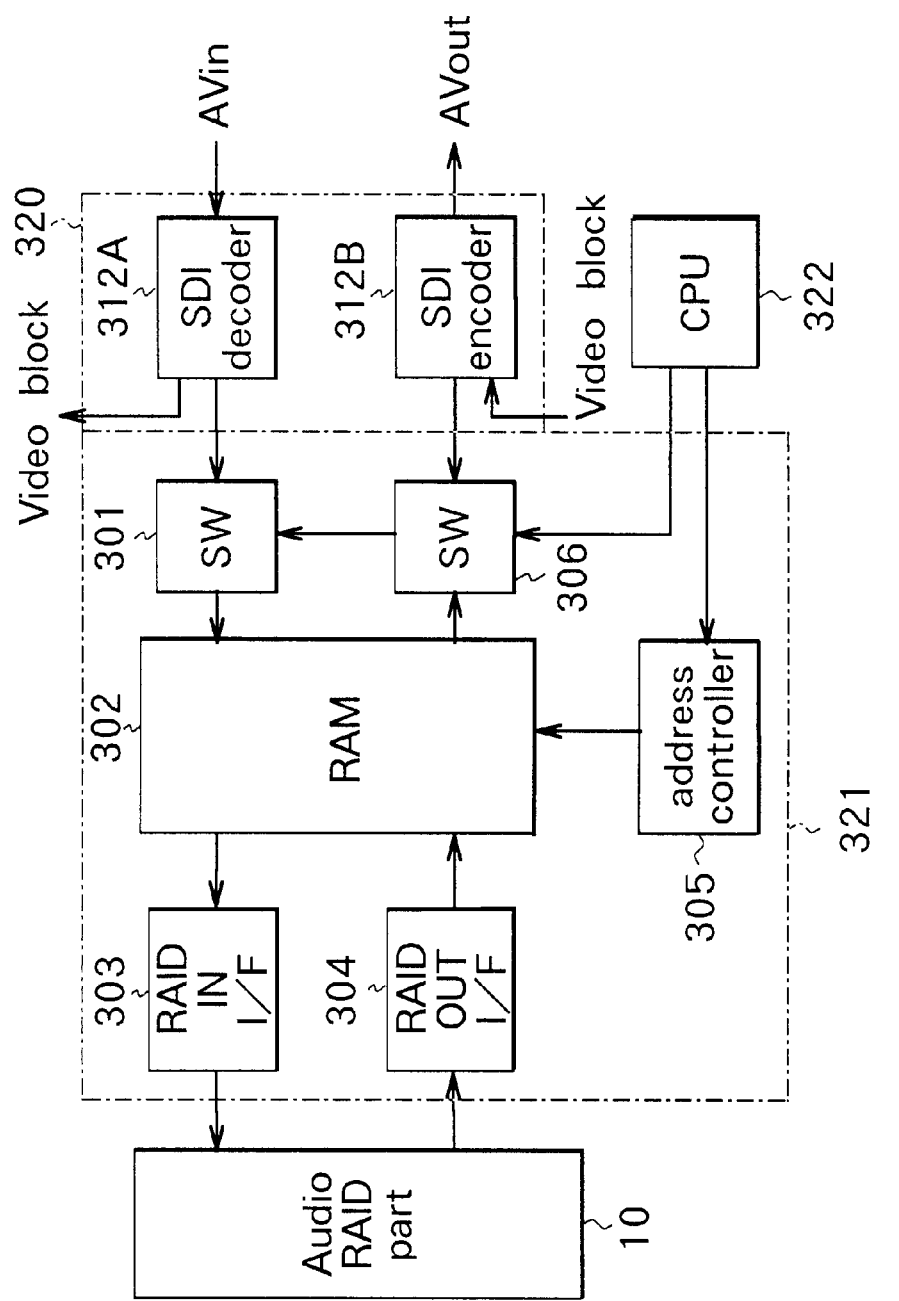
FIG. 2 is a block diagram showing the structure of I/O board of a processor part in FIG. 1.

As shown in FIG. 2, the signal processing part 321 comprises switches (referred to as "SW" in this figure) 301 and 306, a buffer RAM (random access memory) 302, an RAID input interface part (referred to as "RAID IN I/F" in this figure) 303, an RAID output interface part (referred to as "RAID OUT I/F" in this figure) 304 and an address controller 305.

The switch 301 is controlled for conduction or unconduction by a control signal from the CPU 322, and outputs audio signals inputted by the SDI decoder 312A to the RAM 302 selectively.

Output signals of the switch 301 are inputted to the buffer RAM 302 and temporarily stored therein. Then, by a control signal from the CPU 322, the address controller 305 controls the address of RAM 302 so as to output the audio signals which have been temporarily stored. In more detail, when some audio signals are read out from the RAM 302 in which the signals are stored in a certain address, read addressing of those signals is performed to match desired modes of output of those signals. Actually, adjusting the read address of the audio signals stored in the RAM 302 makes it possible to perform various processing such as reversal of audio and acquisition of skipped sound.

Audio signals outputted from the RAM 302 under the control of the address controller 305 are inputted to the RAID input interface part 303.

In the RAID input interface part 303, the audio signals are converted into a format corresponding to a bus which connects the audio RAID part 10 with the I/O boards, and outputted to the audio RAID part 10 as audio signals for recording.

In this way, audio signals outputted from the signal processing part 321 are inputted to the audio RAID part 10.

On the other hand, audio signals which have been reproduced in the audio RAID part 10 and inputted to the signal processing part 321 therefrom are first inputted to the RAID output interface part 304, that is, the process is reverse to that performed by the RAID input interface part 303. Audio signals outputted from the RAID output interface part 304 are inputted to the buffer RAM 302 and temporarily stored therein. Here, the address controller 305 is controlled by a control signal from the CPU 322, and the address controller 305 controls a read address of the audio signals temporarily stored. Control of a read address makes it possible to perform processing such as varying speed reproduction. The audio signals read out from the RAM 302 are outputted from the signal processing part 321 via a switch 306 which is controlled for conduction or unconduction by a control signal from the CPU 322, and inputted to the SDI interface part 320. At the SDI interface part 320, the audio signals are inputted to the SDI encoder 312B together with video signals sent from a video block which is not shown in the figure, and the audio signals and the video signals are multiplexed and outputted as signals in the serial SDI format as described above.

Figures 4, 5:
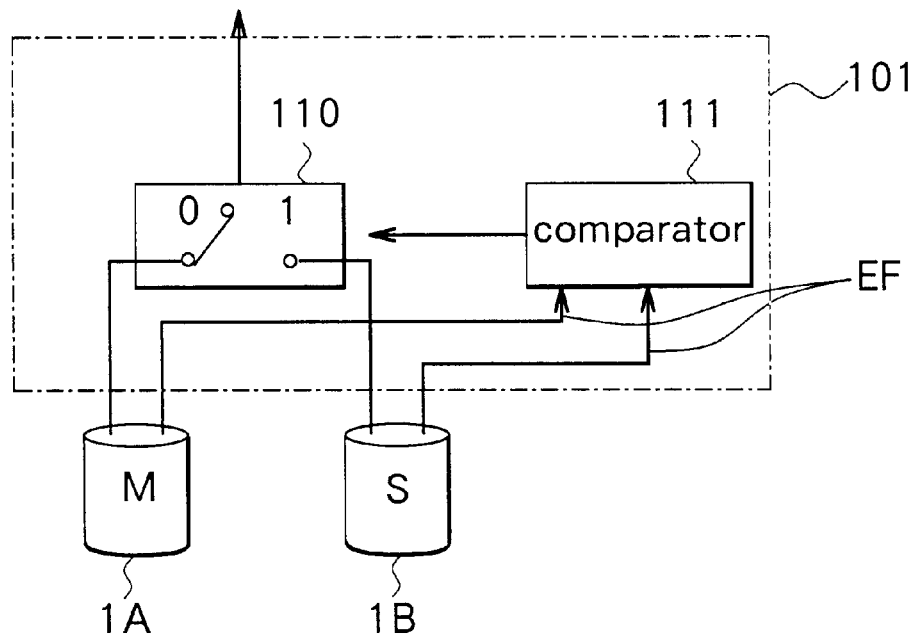
FIG. 4 is a block diagram showing the structure of a selection switch part in FIG. 2.
FIG. 5 is an explanatory view showing operation of comparator circuit in FIG. 4.

With reference to FIG. 4, explanation is now given as to the selection switch parts 101 and 102. As these switch parts are of the same structure, description of the switch part 101 is made here as a representative.

The selection switch part 101 is composed of a changeover switch 110 and a comparator circuit 111, wherein output from either of a corresponding pair of HDDs 1A and 1B is selected by the changeover switch 110 in response to an output of the comparator circuit 111. The comparator circuit 111 compares the status of the pair of HDDs 1A and 1B with regard to the presence or absence of an error flag EF, and sends a changeover signal to the changeover switch 110 for validating an output from the one free from the error flag. Error flag EF indicates failure in the HDD 1A or 1B. In this figure, presence of an error flag is represented by "1" and absence is represented by "0". In this connection, "0" in the changeover switch 110 indicates the HDD 1A side and "1" indicates the HDD 1B side.

Figure 6:
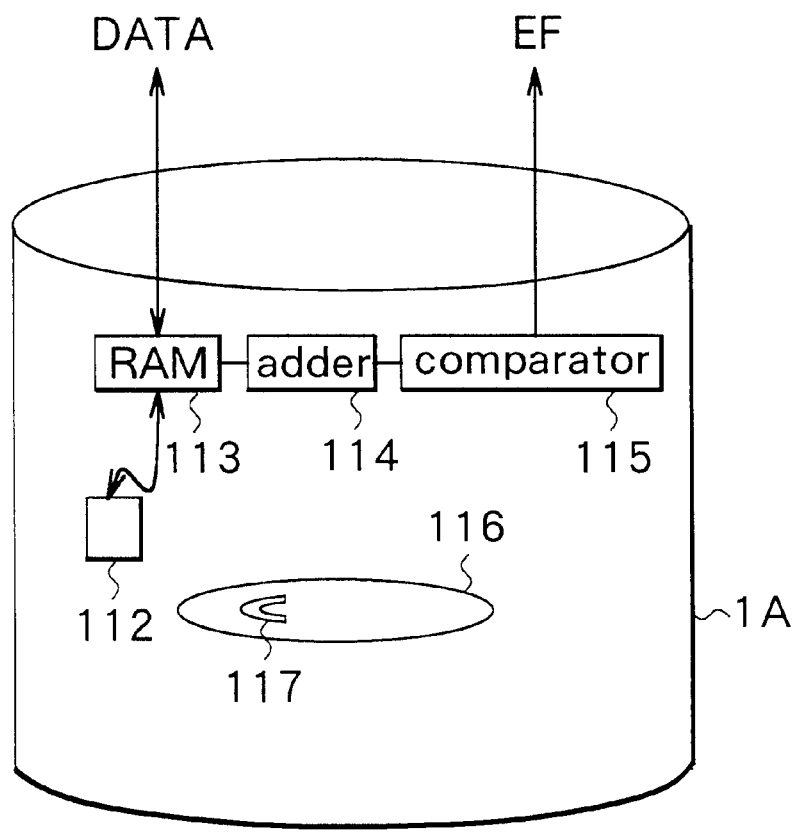
FIG. 6 is an explanatory view for explaining a principle of generation of an error flag of each HDD in FIG. 4.
Figure 7:
FIG. 7 is an explanatory view showing the data format to be written into the hard disks in HDDs in FIG. 6.

The error flag EF transmitted from either of the HDDs are outputted according to a principle shown in FIGS. 6 and 7. In other words, as shown in FIG. 6, the HDD (HDD 1A in this figure) obtains a checksum CS by accumulating the data when writing the data on a hard disk 116 by the sector 117, with a read head 112.

Then, as shown in FIG. 7, the HDD appends the checksum CS to data DATA and writes them on a hard disk in the HDD. On the other hand, when reading, the data DATA read by the read head 112 are led to an adder circuit 114 via a buffer RAM 113. In the adder circuit 114, the read data DATA are added in order to find the checksum CS thereof.

Furthermore, in the comparator circuit 115, the checksums at writing and at reading are compared. If these checksums are different as a result of comparison, an error flag EF is flagged. Therefore, referring back to FIG. 4, the comparator circuit 111 in the selection switch part 101 makes a selection of the changeover switch 110 according to the logic shown in FIG. 5.

Namely, in FIG. 5, "1" in columns M and S indicates the case where HDD 1A (M: master) or 1B (S: slave) flags an error flag EF (presence of an error flag), and "0" indicates the case where HDD 1A or 1B does not flag an error flag (absence of error flag). The comparator circuit 111 switches the changeover switch 110 so that the HDD 1A is selected as a default when neither hard disk 1A or 1B flags an error flag EF (M=0, S=0). The HDD 1A is selected when only the HDD 1B flags an error flag EF (M=0, S=1), and the HDD 1B is selected when only the HDD 1A flags an error flag EF (M=1, S=0). Also, when both of the HDDs 1A and 1B flag an error flag EF (M=1, S=1), the case is decided as faulty and processing is not performed.

Figure 8:
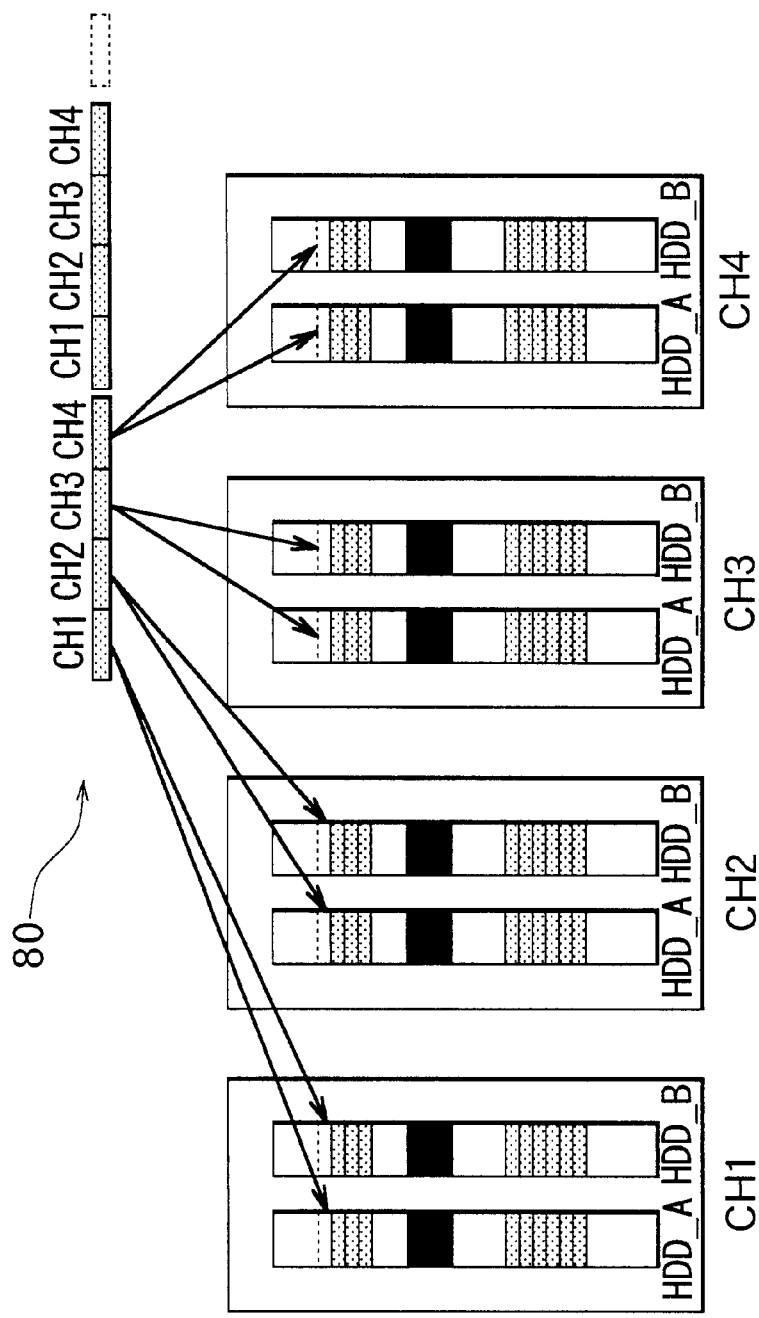
FIG. 8 is an explanatory view for explaining audio data to be stored in an audio RAID part in a video and audio recording and reproducing apparatus according to the invention.

FIG. 8 is a view for explaining audio data to be stored in the audio RAID part 10 in the video and audio recording and reproducing apparatus according to the present invention as described above. Audio data 80 for four channels (CH1 to CH4) from the processor part 30 are physically allocated to and recorded in two HDDs of RAID-1 configuration (referred to as "HDD_A" and "HDD_B" in the figure) corresponding to the respective channels. In this video and audio recording and reproducing apparatus, for respective audio data in the respective channels, a plurality of identical data (logical volume) are stored in different HDDs.

Figure 9:
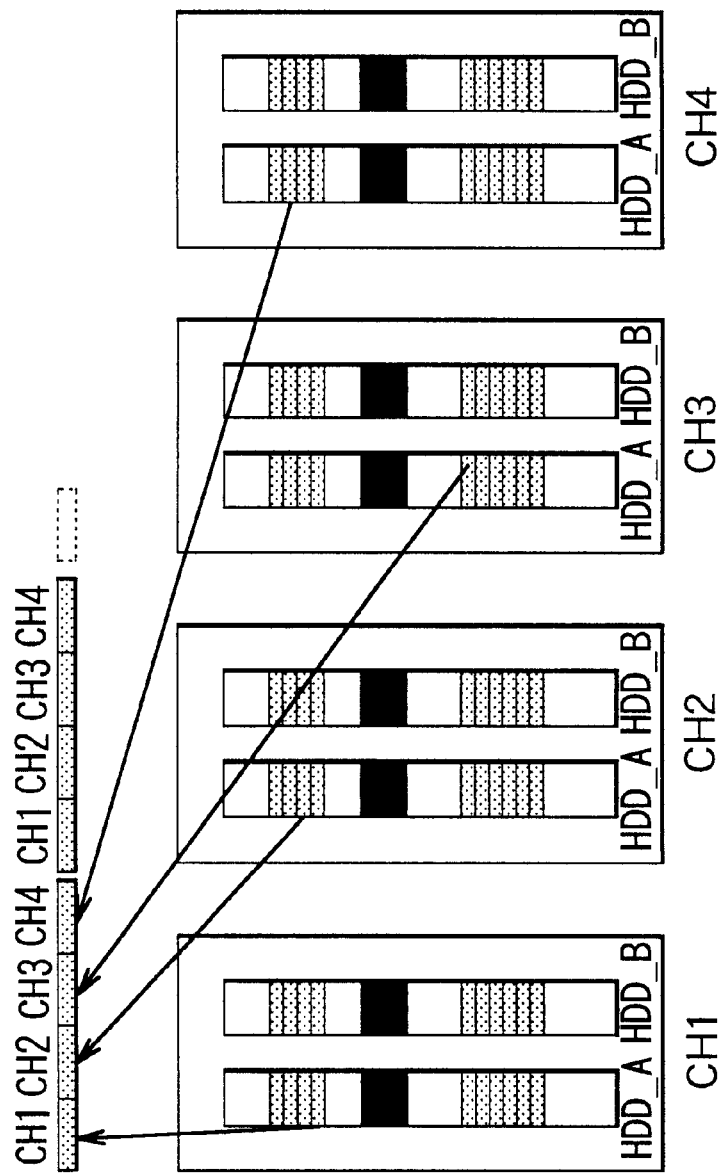
FIG. 9 is an explanatory view for explaining audio data at reading in a video and audio recording and reproducing apparatus according to the invention.

On the other hand, FIG. 9 is a view for explaining audio data at reading in the video and audio recording and reproducing apparatus according to the present invention. As shown in FIG. 9, as the audio RAID part 10 including four sets of HDDs of RAID-1 configuration can control each set of the HDDs independently, it is possible to read out files which have been physically allocated to various sites, from each channel.

Therefore, it is possible to broadcast narrations in different languages for each channel or to make substitution of BGM.

Obviously many modifications and variations of the present invention are possible as far as they do not deviate from the spirit and scope thereof It is therefore to be understood that the invention is not limited by its specific embodiments and may be practiced otherwise within the scope of the claims attached hereto.

What is claimed is:

1. Video and audio recording and reproducing apparatus for recording video data and audio data on a video recording medium and on separate audio recording media, respectively, and reproducing video data and audio data from said video recording medium and said respective audio recording media, comprising;
    a video data recording unit for writing video data on and reading video data from a nonlinear accessible video recording medium;
    an audio data recording unit for writing audio data provided in plural audio channels on and reading audio data from nonlinear accessible audio recording media different from said video recording medium, said audio data recording unit operating independently of said video data recording unit;
    plural input-output means connected with said video data recording unit and said audio data recording unit for inputting thereto and outputting therefrom video data and audio data, each input-output means including a separator for receiving multiplexed audio data and video data in predetermined serial format and for separating the audio data and the video data from the serial format multiplexed data;
    a temporary store for temporarily storing audio data separated by said separator; and
    a controller for controlling writing by said audio data recording unit of audio data temporarily stored in said temporary store.

2. The apparatus of claim 1, wherein said separator includes a serial digital interface.

3. Video and audio recording and reproducing apparatus for recording video data and audio data on a video recording medium and on separate audio recording media, respectively, and reproducing video data and audio data from said video recording medium and said respective audio recording media, comprising;
    a video data recording unit for writing video data on and reading video data from a nonlinear accessible video recording medium;
    an audio data recording unit for writing audio data provided in plural audio channels on and reading audio data from nonlinear accessible audio recording media different from said video recording medium, said audio data recording unit operating independently of said video data recording unit; and
    said audio data recording unit being comprised of plural pairs of recording units, each pair being associated with a respective one audio channel such that audio data in a particular audio channel is recorded on a particular pair of recording units associated with that particular audio channel, and each pair including first and second recording units for writing only audio data of said particular audio channel identically on both said first and second recording units of a respective pair, a fault detector for detecting a fault in a recording unit of said respective pair and a reader for reading audio data from the recording unit in said pair that is determined not to exhibit a fault.

4. The apparatus of claim 3, wherein said fault detector compares the data written on a recording unit to the data read from said recording unit to selectively produce an error flag for said recording unit, and wherein said reader includes an error flag sensor for sensing the presence or absence of an error flag for the recording unit of a pair to control the reader to read audio data from the error-flag-free recording unit of said pair.

5. A method of recording video data and audio data on a video recording medium and on separate audio recording media, respectively, and reproducing video data and audio data from said video recording medium and said respective audio recording media, comprising the steps of:
    receiving multiplexed audio data and video data in predetermined serial format;
    separating the audio data and the video data from the received serial format multiplexed data;
    temporarily storing the separated audio data;
    writing the video data on and reading video data from a nonlinear accessible video recording medium;

writing the audio data provided in plural audio channels on and reading audio data from nonlinear accessible audio recording media different from said video recording medium, said writing and reading of audio data being independent of the writing and reading of said video data; and controlling the writing onto the audio recording media of the temporarily stored audio data.

6. The method of claim 5, wherein said predetermined serial format is a serial digital interface.

7. A method of recording video data and audio data on a video recording medium and on separate audio recording media, respectively, and reproducing video data and audio data from said video recording medium and said respective audio recording media, comprising the steps of:

writing video data on and reading video data from a nonlinear accessible video recording medium;

writing audio data provided in plural audio channels on and reading audio data from nonlinear accessible audio recording media different from said video recording medium, said writing and reading of audio data being independent of the writing and reading of said video data, wherein only audio data of a particular channel is written, identically, on both first and second recording units of a pair of recording units associated with said particular audio channel;

detecting a fault in a recording unit of a respective pair; and reading audio data from the recording unit in said pair that is determined not to exhibit a fault.

8. The method of claim 7, wherein a fault is detected by comparing the data written on a recording unit to the data read from said recording unit to selectively produce an error flag for said recording unit; and wherein the presence or absence of an error flag for the recording unit of a pair is sensed to control the reading of audio data from the error-flag-free recording unit of said pair.

* * * * *